United States Patent Office 3,009,901
Patented Nov. 21, 1961

3,009,901
REACTION PRODUCTS OF PHENOLIC DI-AMINES WITH ISOCYANATE TERMINATED POLYETHERS
August H. Frazer, Wilmington, Del., assignor to E. I. du Pont de Nemours and Company, Wilmington, Del., a corporation of Delaware
No Drawing. Filed Jan. 9, 1958, Ser. No. 707,877
19 Claims. (Cl. 260—47)

This invention relates to a new class of polymers and especially to the elastic products obtained from these compositions. It further relates to shaped articles prepared from such polymers.

There is a need for polymers with improved properties for use in such end use applications as molded objects, films, filaments, fibers, bristles, papers, woven and non-woven fabrics, and the like. There is a particular need in textile applications for elastic products with better abrasion resistance and improved oxidative stability as compared to the elastic filaments now available.

In many textile applications it is necessary to cover rubber threads to provide a suitable overall balance of properties. It would be desirable to have available elastomers which can be formed into fibers having the requisite properties without the need for any covering treatment. In textile applications it is particularly desirable to have an elastomer which possesses the desired characteristics without the need for curing. Improved curable elastomers and cured products with improved properties are also needed. There is a particular need for a synthetic elastomer which can be cured quickly and completely at moderate temperatures. Many of the presently available synthetic materials which are suitable for fiber applications suffer from poor oxidative stability.

It is accordingly, an object of this invention to provide new synthetic materials capable of being formed into shaped articles having outstanding abrasion resistance. Another object is to provide synthetic elastic polymers which degrade less rapidly on exposure to oxygen and high temperatures. A further object is to provide linear synthetic polymers which are particularly adapted to the preparation of filaments, especially those which have high elastic recovery and which do not require curing or cross-linking to obtain these properties. A further object is to provide polymers which can be cured completely in a short period of time to produce articles which do not become brittle at low temperatures. A still further object is to provide methods for preparing the linear and the cured polymers. Other objects will appear as the description of the invention proceeds.

These and other objects are accomplished by the provision of a substantially linear polyether-urethane-urea polymer comprising a urea segment containing the group —NH—R—NH—, said segment being at least one repeating unit of a urea polymer having a melting point above about 200° C. in its fiber-forming molecular weight range; i.e., above about 10,000, the said segment being connected through urethane linkages to a second segment, said second segment being the residue on removal of terminal OH groups from a polyether glycol having a melting point below about 60° C. and a molecular weight above about 600, wherein R is the residue on removal of $NH_2$ groups from an aromatic diamine containing one or more phenolic OH groups.

One method for preparing such polymers is to react a selected polyether glycol with a molar excess of an organic diisocyanate to provide a polymer with terminal isocyanate groups. The isocyanate-terminated polymer is then reacted with an aromatic diamine containing one or more phenolic OH groups to provide the linear polymers of this invention.

For utility in fiber and filament applications, it is desirable to have elastic products which require no after-curing or after-treatment. Substantially linear polymers capable of forming filaments with a tensile recovery above 90% and a stress decay below 20% without a curing or a cross-linking treatment are suitable for the production of elastic fibers. Suitable polymers are composed of "soft segments" and "hard segments" alternating in the polymer chain. The "soft segment" is a polyether having a molecular weight between about 600 and 8000 and melting below about 60° C. As indicated above, such a polymer may be reacted at each end with a suitable quantity of diisocyanate. The isocyanate-terminated "soft segments" may then be united by reaction with a suitable phenolic diamine. The isocyanate-amine-isocyanate portion of the resulting polymer chain then constitutes the "hard-segment." For elastic fiber applications the suitable diisocyanates used to provide isocyanate ends for the "soft segments" should be able to react with the diamine to form a polymer with a melting point above 200° C. when the molecular weight is high enough to be in the fiber-forming range. The preferred elastomeric products for fiber applications have melting points above about 150° C., and the "soft segments" of the preferred elastomers have molecular weights between 800 and 3500.

To produce polymers which are elastomers at room temperature, it is required that the "soft segments" comprise about 60 to 90% by weight of the polymeric product. Under the specified conditions and for certain end uses, low molecular weight compounds having end groups containing active hydrogen may be used along with the polyether glycol. Conversely, small amounts of non-phenolic diamines may be used in addition to the phenolic diamines in forming the "hard segments." The term "substantially linear" as used above is not intended to exclude polymers which have branches extending out from the main polymer chain. The cross-linked cured products of this invention are generally obtained by reacting the substantially linear polymers with a polyfunctional reagent capable of reacting with the phenolic groups introduced into the polymer chain by means of the phenolic diamine. Such cross-linking reagents include diisocyanates and formaldehyde.

The polyether glycol from which the "soft segment" in the elastomer is derived may contain a single type of linkage, such as in the poly(alkylene oxide) glycols, or it may have more than one type of linkage, as in the polyoxythiaalkylene glycol. Even where the linkages are the same, the compositions may be a copolymer such as a copolyether. Copolymer formation is a useful method for modifying the properties of the polyether "soft segment." The polyether glycols may be substituted with halogen, alkyl, and similar groups, which do not interfere with the subsequent polymerization under the conditions used. For the preparation of elastic products, the proper reactants are chosen to produce a low molecular weight polymer with the required low melting point. Compounds with the desired combination of molecular weight and low melting point are usually obtained by interrupting the structure frequently with side chains or by introducing atoms other than carbon atoms into the main polymer chain.

Representative polyethers which may be used include the poly(alkylene oxide) glycols, such as polyethylene glycol, polypropylene glycol, poly(tetramethylene oxide) glycol, poly (pentamethylene oxide) glycol, and polydioxolane and other formals prepared by reacting formaldehyde with other glycols. Mixtures of glycols may also be used to prepare copolyethers. For the purposes of this invention, the preferred polyether glycols include poly-(tetramethylene oxide) glycol and glycols of poly(tetramethylene oxide) having urethane groups in the polymer chain.

Suitable organic diisocyanates which may be employed for reaction with the polyether glycols include aromatic, aliphatic, cycloaliphatic diisocyanates, and combinations of these types. Representative compounds include p-phenylene diisocyanate, 4,4'-biphenylene diisocyanate, p,p'-methylenediphenyl diisocyanate, 1,5-naphthylene diisocyanate, 1,4-cyclohexylene diisocyanate, and 1,5-tetrahydronaphthylene diisocyanate. The diisocyanates may contain other substituents, although those which are free from reactive groups other than the two diisocyanate groups are ordinarily preferred.

The urethane linkage between "hard" and "soft" segments may be obtained by routes other than by the reaction of diisocyanates with polyether glycols. For example, a polyether glycol may be reacted with an excess of phosgene to form a bischloroformate which on reaction with phenolic diamines and bicarbamyl halides provides urea "hard segments" connected by urethane linkages to polyether "soft segments."

Suitable phenolic diamines include 2,4-diaminophenol, 2,4-diaminonaphthol, and 2,2' - diamino - 5,5' - biphenol. Subject to the limitations listed above, any phenolic diamine may be used providing that each amino group is attached to an aromatic ring. The groups need not necessarily be in the same ring. For the purposes of this invention, the preferred phenolic diamine is 2,4-diaminophenol.

The phenolic diamine may be used in the polymerization reaction as such, or preferably it may be generated from its dihydrochloride salt in the usual manner. For example, the diamine dihydrochloride in a suitable solvent such as N,N-dimethylformamide may be treated with sodium bicarbonate and the free diamine used without isolation from the solution.

The elastomeric products of this invention may be prepared according to several different procedures. The preferred method is that in which a diisocyanate is used to react with the polyether glycol for the formation of the urethane linkage. The formation of isocyanate-terminated polyether will be accompanied by no appreciable chain lengthening if two mols or more of diisocyanate are reacted per one mol of polyether glycol. If less than a 2:1 molar ratio is used, a polyether-urethane will be formed with corresponding increase in molecular weight. The reaction of the isocyanate with the polyether glycol is carried out in the usual manner, that is, by admixing the anhydrous reagants at steam bath temperatures. However, the polymerization of the diisocyanate-terminated polyether with phenolic diamine is generally carried out at temperatures less than room temperature. A temperature of about 0° C. is preferred. At this temperature, the activity of the phenolic group is so low that only the two amino groups react with the macrodiisocyanate.

Although various methods of polymerization may be used in the reaction of a phenolic diamine with the macrodiisocyanate, solution polymerization is the preferred method. This method involves dissolving the phenolic diamine in a solvent and one or more complementary reactants in separate portions of the same solvent and then mixing the solutions under conditions suitable for forming high molecular weight polymers. The solvent is usually one which is relatively inert to the reactants. Suitable solvents for use in this process include N,N-dimethylformamide, N,N-dimethylacetamide, tetrahydrofuran, dimethylsulfoxide, and mixtures of acetone with N,N-dimethylformamide. To facilitate formation of high molecular weight polymers, acid acceptors are used in the system when an acid is liberated by the reaction, such as in the reaction of phenolic diamines with bischloroformates.

In this specification "tenacity" is a measure of the tensile strength of fibers expressed in grams per denier (g.p.d.). "Elongation" is the percent elongation of the fiber at the breaking point. "Initial modulus" is determined by measuring the initial slope of the stress-strain curve. "$M_{50}$" is the slope of the stress-strain curve at 50% elongation. "Polymer melt temperature" is the minimum temperature at which a sample of the polymer leaves a wet, molten trail as it is stroked with moderate pressure across the smooth surface of a heated brass block. "Elastic recovery" or "tensile recovery" is the percentage return to the original length within one minute after the tension has been released from a sample which has been elongated 50% at the rate of 100% per minute and held at 50% elongation for one minute. "Stress decay" is the percent loss in stress in a yarn one minute after it has been elongated to 50% at the rate of 100% per minute.

The following examples are given by way of illustration and not limitation, since any of the polyethers, phenolic diamines or diisocyanates mentioned above may be substituted in like amount for those indicated in the examples. The parts given are by weight except where otherwise noted.

*Example I*

Twenty parts of p,p'-methylenediphenyl diisocyanate is reacted under nitrogen for one hour at 90–95° C. with 40 parts of dry poly(tetramethylene oxide) glycol having an average molecular weight of approximately 1000. The polyether diurethane with terminal isocyanate groups is thereby produced. The product is dissolved in 100 parts of dimethylformamide. The solution is cooled to 0° C., and to the cooled solution is slowly added with stirring a solution of 2,4-diaminophenol in dimethylformamide. The phenolic diamine solution is that obtained by the addition of 6.8 parts of sodium bicarbonate to 7.88 parts of 2,4-diaminophenol dihydrochloride in 50 parts of dimethylformamide, and then filtering to remove residual salt. After addition of the phenolic diamine, the solution is stirred at 0° C. for 15 minutes and is then heated to 125° C. for the purpose of dry spinning into filament form. The as-spun fibers are elastomeric and have a tenacity of 0.36 g.p.d., an elongation of 534%, an initial modulus of 0.15 g.p.d., $M_{50}$ of 0.08 g.p.d., tensile recovery of 94%, and stress decay of 12%.

*Example II*

Three mols of dry poly(tetramethylene oxide) glycol having an average molecular weight of approximately 1000 is reacted with 2 mols of 2,4-tolylene diisocyanate by heating for 3 hours on a steam bath under nitrogen. A low molecular weight polymer having hydroxyl end groups and containing an average of 3 poly(tetramethylene oxide) groups per molecule is obtained. 67 parts of this material is reacted under nitrogen with 10 parts of p,p'-methylenediphenyl diisocyanate for 1 hour at 90–95° C. An isocyanate-terminated polymer is thereby produced. 77 parts of this polymeric intermediate is dissolved in 100 parts of dimethylformamide. Five parts of p,p'-methylenediphenyl diisocyanate is added, the mixture cooled to 0° C., and to the cooled solution is added slowly a mixture of 4.96 parts of p,p'-methylenedianiline, together with the 2,4-diaminophenol liberated by 2.56 parts of sodium bicarbonate acting on 2.96 parts of the diamine dihydrochloride in 90 parts of dimethylformamide (residual salt removed, as before). The mixture is stirred at 0° for 15 minutes and is then dry-spun into fibers at 125–135° C. in the usual manner. The as-spun, elastomeric fibers contain approximately 4 mol percent of diaminophenol residue and possess the following properties: tenacity 0.60 g.p.d., elongation 656%, initial modulus 0.05 g.p.d., $M_{50}$ 0.05 g.p.d., tensile recovery 98%, and stress decay 8%.

The as-spun fibers are heated in 100° C. air for 100 hours. The following properties are then observed: tenacity 0.50 g.p.d., elongation 550%, initial modulus 0.06 g.p.d., $M_{50}$ 0.06 g.p.d., tensile recovery 93%, stress decay 10%.

Example III

An elastomer similarly constituted to that of Example II but in which ethylenediamine is used in place of diaminophenol is dry spun into fibers in a similar fashion, and has a tenacity of 0.8 g.p.d. After the fibers are heated in 105° C. air for 64 hours, the tenacity has fallen to 0.3 g.p.d.

Example IV 77 parts of the isocyanate-terminated polymer of Example II and 8.75 parts of p,p'-methylenediphenyl diisocyanate, in 100 parts of dimethylformamide is reacted in the manner described in Example II with 4.54 parts of p,p'-methylenedianiline and the phenolic diamine liberated by 4.6 parts of sodium bicarbonate acting on 5.91 parts of 2,4-diaminophenol dihydrochloride in 90 parts of dimethylformamide. As before, a viscous solution which is spinnable into fibers is obtained. The as-spun fibers display the following properties: tenacity 0.64 g.p.d., elongation 452%, initial modulus 0.08 g.p.d., $M_{50}$ 0.07 g.p.d., tensile recovery 96%, stress decay 11%.

The as-spun fibers are heated in 100° C. air for 120 hours. They then display the following properties: tenacity 0.50 g.p.d., elongation 380%, initial modulus 0.10 g.p.d., $M_{50}$ 0.08 g.p.d., tensile recovery 93%, stress decay 12%.

Example V 10 parts of the as-spun fibers of Example IV (before oxidative stability test) are treated for ½ hour at 80° C. with 10 parts of p,p'-methylenediphenyl diisocyanate in 325 parts of benzene. After such treatment, the fibers become infusible and insoluble in dimethylformamide-type solvents. The apparently cross-linked fibers display the following properties: tenacity 1.5 g.p.d., elongation 582%, initial modulus 0.20 g.p.d., $M_{50}$ 0.13 g.p.d., tensile recovery 95%, stress decay 12%.

The linear uncured products of this invention find utility in the preparation of elastic films and filaments. The products of this invention have unusually good oxidative stability. Oxidative stability may be determined by comparing the tenacity of filaments before and after heating the filaments in air. The elastomers of this invention with phenolic groups in the polymer chain have improved oxidative stability due to the presence of the phenolic group in the polymer molecule. It may be that incorporation of phenolic materials into polymers of the prior art would achieve a degree of oxidative stability, but such added materials frequently wash out or wear away or are otherwise removed from these elastomers in use. A "built-in" antioxidant would not suffer from such disadvantages. Furthermore, these phenolic groups in the polymer chain may serve as reactive sites for further chemical reactions of the polymer. Fibers formed from these elastomers may be cross-linked by subsequent reaction of the phenolic sites with suitable cross-linking agents, of which the diisocyanates are the preferred species. It will be apparent to one skilled in the art that other modifications of such fibers; that is, for improved dye-ability, for reduction of static, for surface modification, etc., are possible utilizing the phenolic groups as reaction sites.

As indicated above, the substantially linear products of this invention are elastic, homogeneous solids which may be cured to form a vulcanized elastomer. The elastic nature of the product depends, among other things, upon the molecular weight of the polyether glycol used. If a low melting material (that is, below about 60° C.) with the molecular weight in the upper end of the range (about 3000 to about 8000) is used, the product will tend to be a rather soft, moderately elastic product which is well suited to applications where a curing agent will be used, such as in the preparation of molded sheets, tubes, rods, and in the preparation of foams. The softer final products of this invention are ideally suited for the preparation of cured molded objects since they can be readily deformed under low pressures. Curing is often facilitated by incorporating a small amount of magnesium oxide with the uncured elastomer. In practice, the addition of from 1 to 20% of a diisocyanate, based on the weight of the uncured reaction product, is adequate for curing. The diisocyanate may be conveniently mixed with the uncured product on a rubber mill, and the mixture may then be cured under the usual conditions for processing ordinary rubber.

When the reaction has been carried out in a solvent in which the reaction product remains soluble, films or coatings may be formed by pouring or otherwise applying the solution to form a thin film and allowing the solvent to evaporate. Curing can take place simultaneously if a curing agent is present.

Conventional procedures can be used for preparing films and filaments from these polymers. For example, filaments can be prepared readily by dry spinning in conventional equipment. Solvents which have been found satisfactory for preparing solutions of suitable concentration for dry spinning are dimethylformamide, dimethylacetamide, and the like.

Wet spinning may also be carried out successfully. A preferred solvent for wet spinning is dimethylformamide, and such solutions are usually extruded into a hot water bath.

The polymers of this invention possess a number of advantageous properties, including excellent resistance to heat and cold, outstanding resistance to mechanical abrasion, and to deterioration caused by stretching, flexing and the like. Since they have a low brittle point, they are particularly useful for fabricating articles to be used at low temperatures. This combination of properties suggests the use of these polymers as uncovered filaments in elastic fabrics and garments. Obviously, these filaments and fibers can also be useful in fabrics and garments when they are covered, as rubber is for such applications.

The elastomeric properties of these materials may be varied by suitable compounding. The amount and type of compounding agent to be incorporated in the stock is dependent on the use for which the elastomer is intended. The compounding agents ordinarily used in the rubber industry are useful for this invention. These include carbon black, clay, silica, pigments, and plasticizers. Inorganic and organic coloring agents may be incorporated to give a well-defined color.

The compounded, uncured elastomers of this invention may be dissolved in, or extended with, solvents to permit their application as coatings. Suitable organic liquids for this purpose include dimethylformamide, dimethylacetamide, and tetrahydrofuran. Smooth films may be formed by evaporating the solvent.

Yarns of this invention have many advantages over rubber threads. For example, they may be spun readily as multi-filament yarns and as low denier filiments. It is possible to prepare filaments of deniers as low as 1 by dry spinning methods although 2 to 20 denier filaments are preferred. Wet spinning is usually used to spin the polymers into filaments of from 20 to 200 denier. They have superior abrasion resistance, need no plasticizer, and have a good resistance to perspiration, greases, and other common chemicals. Furthermore, these elastic yarns are capable of very quick elastic recovery, a property which is lacking in many of the so-called elastic fibers.

In the specification and claims, urea includes thiourea; urethane, includes thiourethane; and diisocyanate includes diisothiocyanates.

It will be apparent that many widely different embodiments of this invention may be made without departing from the spirit and scope thereof, and therefore it is not intended to be limited except as indicated in the appended claims.

I claim:
1. A substantially linear polyether-urethaneurea copolymer consisting essentially of the reaction product of (1) an isocyanate-terminated polyether prepared by reacting a hydroxyl-terminated polyether glycol having a melting point below about 60° C. and a molecular weight above about 600 with a molar excess of an organic diisocyanate, and (2) an aromatic diamine containing at least one phenolic OH group and having the amine groups attached to carbon atoms of an aromatic ring, said aromatic diamine being capable of forming with said organic diisocyanate a urea polymer having a melting point above 200° C. in the fiber-forming molecular weight range.

2. The copolymer of claim 1 in the form of a filament.

3. The copolymer of claim 1 in the form of a film.

4. The filament of claim 2 which has a tensile recovery above 90% and a stress decay below 20% without curing.

5. The copolymer of claim 1 in which the said polyether has a molecular weight between about 600 and 8,000.

6. The filament of claim 2 in which the melting point of the copolymer is above 150° C.

7. The filament of claim 2 in which the molecular weight of the polyether is between 800 and 3,500.

8. The copolymer of claim 1 in which the polyether is present in the amount of 60% to 90% by weight of the copolymer.

9. The copolymer of claim 1 in which the aromatic diamine is 2,4-diaminophenol.

10. The copolymer of claim 1 in which the aromatic diamine is 2,4-diaminonaphthol.

11. The copolymer of claim 1 in which the aromatic diamine is 2,2'-diamino-5,5'-biphenol.

12. The process of preparing substantially linear polyether-urethane-urea copolymers which comprises reacting a polyether glycol having terminal hydroxyl groups, a melting point below 60° C., and a molecular weight above about 600 with a molar excess of an organic diisocyanate to provide a polymer with terminal isocyanate groups, and then reacting the said isocyanate terminated polymer at a temperature below room temperature with an aromatic diamine containing at least one phenolic hydroxyl group and having both amino groups attached to an aromatic ring, said organic diisocyanate and said aromatic diamine being capable of forming a urea polymer having a melting point above 200° C. in the fiber-forming molecular weight range.

13. The process of claim 12 in which the temperature is about 0° C.

14. The process of claim 12 in which the reaction of the phenolic diamine and said isocyanate terminated polymer is carried out in solution.

15. The process of claim 14 in which said solution is comprised of N,N-dimethylformamide.

16. The process of claim 12 in which from 1% to 20% of an organic diisocyanate and a small amount of magnesium oxide is added to the copolymer and the copolymer is cured.

17. The copolymer of claim 1 in which said polyether glycol is polytetramethylene oxide glycol.

18. The copolymer of claim 1 in which said polyether glycol is polytetramethylene oxide glycol having urethane groups in the polymer chain.

19. A cured elastomer of the polymer of claim 1.

References Cited in the file of this patent
FOREIGN PATENTS
519,014   Belgium _____ Oct. 5, 1953